Sept. 16, 1952  W. J. GOEDEKE ET AL  2,610,518
PUSH-BUTTON CONTROL FOR THE OPERATION OF AUTOMOBILES
Filed June 6, 1951  4 Sheets-Sheet 1

INVENTORS
WILLIAM L. HARTMAN,
WILLIAM J. GOEDEKE, DEC'D,
ANN GOEDEKE,
ADMINISTRATRIX

BY Aksel M. Pedersen
ATTORNEY

Sept. 16, 1952   W. J. GOEDEKE ET AL   2,610,518
PUSH-BUTTON CONTROL FOR THE OPERATION OF AUTOMOBILES
Filed June 6, 1951                           4 Sheets-Sheet 3

INVENTORS
WILLIAM L. HARTMAN,
WILLIAM J. GOEDEKE, DEC'D
ANN GOEDEKE,
ADMINISTRATRIX

BY           Axel M. Pedersen
                ATTORNEY

Sept. 16, 1952 W. J. GOEDEKE ET AL 2,610,518
PUSH-BUTTON CONTROL FOR THE OPERATION OF AUTOMOBILES
Filed June 6, 1951 4 Sheets-Sheet 4
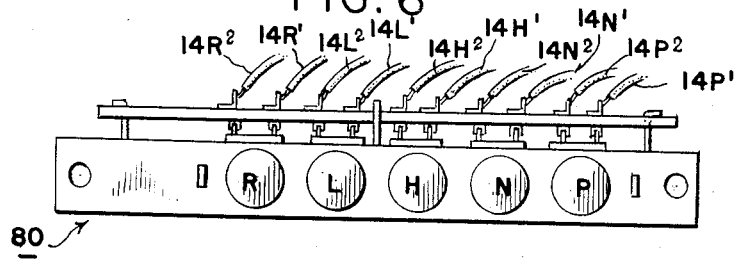
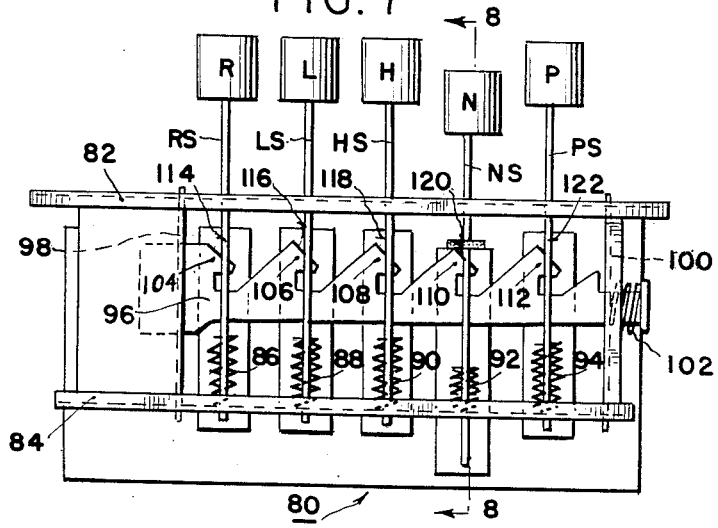
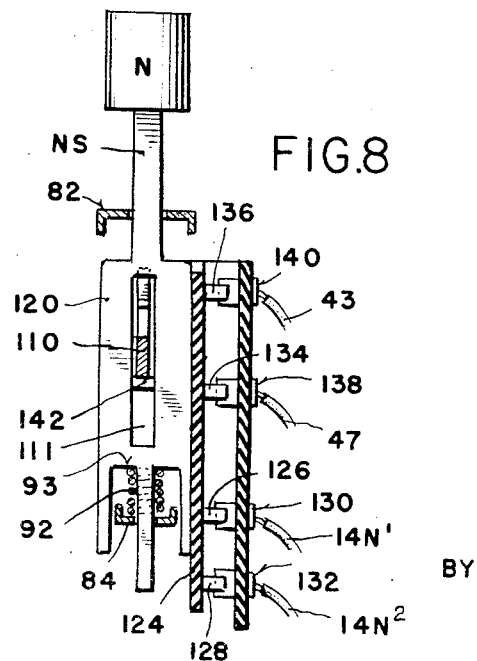
INVENTORS
WILLIAM L. HARTMAN,
WILLIAM J. GOEDEKE, DEC'D
ANN GOEDEKE,
ADMINISTRATRIX
BY
Aksel M. Pedersen
ATTORNEY Patented Sept. 16, 1952

2,610,518

UNITED STATES PATENT OFFICE 2,610,518

PUSH-BUTTON CONTROL FOR THE OPERATION OF AUTOMOBILES

William James Goedeke, deceased, late of Trenton, N. J., by Ann Goedeke, administratrix, Trenton, N. J., and William Lester Hartman, Miami, Fla.

Application June 6, 1951, Serial No. 230,238

11 Claims. (Cl. 74—365)

This invention relates to push button remote control for the operation of automatic transmissions of automobiles of the torque convertor and planetary gear types, and more particularly for push button remote control for the operation of automobiles, including an electric motor operated mechanism for the operation of automatic transmissions to operate and control the selector valve of the transmission in selective speeds and in forward and reverse directions of travel.

Various attempts have heretofore been made to provide automatic means for shifting gears and the like to replace hand operation and control so as to simplify automobile operation. But such devices have not proved satisfactory and have not been adopted commercially. In the constructions heretofore developed, the complexity of the devices and cost of installation have been contributing factors against acceptance.

The push button control assembly for use on automobiles with automatic transmissions comprises two units, the control button assembly and the control selector assembly. The control button assembly of my invention is preferably mounted on the steering post so as to be in the most accessible position, but, if desired, it may be mounted on top of the steering wheel, some of the buttons being accessible to the left hand digits and others to the digits of the right hand, or the push buttons may be mounted in any suitable place convenient for operation by the driver.

The control assembly may contain as many buttons as are necessary to operate the transmission selector valve, although the device preferably includes five buttons as herein described and shown in the drawings, which are necessary to control one type of automatic transmission. Other types of automatic transmission may require four buttons, and others six or more, depending on the complexity of the transmission and the desired variations in speed. It may be desirable in some forms of installation to employ, for example, two speeds in reverse, one slow speed and one intermediate speed.

Signal lamps are preferably used as a part of the assembly to designate the speed or position in which the transmission is operating, in accordance with the particular button which has been pressed for operation. These signal lamps are preferably mounted on the control button assembly face plate adjacent to the buttons, so that it is immediately apparent when each of the buttons has been operated. Restoring means are employed in connection with the assembly so that as soon as a different button is pressed from that already in operation, each of the other buttons will be restored to their inoperative positions, and the signal lamps are simultaneously operated to indicate the change which has taken place, that is, the light adjacent the button formerly in operation is extinguished and the light or signal lamp adjacent the new button which has been pressed is lighted and immediately indicates which button has been pressed. The signal lights may obviously be placed in any desired position and may be mounted on the instrument panel of the car if desirable. The signal lamps may be used in duplicate, if desired, one being mounted adjacent each button, and the second lamp being mounted on the instrument panel, so that in the event that a lamp burns out, the duplicate signal will indicate when the associated button has been operated.

Each of the buttons locks automatically in the depressed position and each button while being depressed releases any previously depressed button, whereby the control selector will not be called upon to operate in more than one direction at a time. The tops of the buttons should not protrude above the flat surface of the control button face plate, so that the buttons may not be depressed accidentally or unintentionally.

The control button assembly is connected to the control selector assembly by a cable consisting of a sufficient number of wires to complete the circuits required by the operation of the transmission. Ground connection to the electrical system is preferably made to the frame of the automobile to which the car battery is also connected by a wire carried in the connecting cable.

The control selector assembly preferably consists of a lever operated by an electric motor through a train of gears of approximately a 1000 to 1 ratio. The entire mechanism including the electric motor is preferably enclosed in a metal box with only the selector lever shaft protruding, and the cable which houses the necessary control wiring is preferably attached to the side plate on which the contacts are mounted. In the control selector assembly is a disc having segments of metal attached thereto which are so arranged that the disc assembly, hereinafter referred to as the selector disc assembly, is mounted on the control selector lever shaft and turns with the shaft. Contactors which are mounted on one side plate of the housing bear upon and make electrical contact with segments of the selector disc. The selector disc thereby distributes to the control buttons the proper polarity of electrical energy, so that when a button is depressed it will energize the control selector motor to operate in a selective direction corresponding to the designation of the depressed button. The control selector lever is thereby aligned in position to actuate the transmission control selector valve.

Because of the special design of the selector disc, as hereinafter described in connection with the drawings, if the mechanism should tend to override the designated position selected, the mechanism will be automatically reversed and aligned at substantially the center of the insulated spot on the selector disc, and therefore the selector valve in transmission will be in a proper position to operate the transmission in the speed selected.

The control selector assembly is preferably mounted on the automobile chassis frame by an adaptor bracket and the control selector lever is connected to the transmission control lever by a rod with an adjustable clevis. The clevis allows for any adjustment necessary to compensate for any variation in alignment of the connected units.

One of the objects of the invention is to provide a push button remote control device adapted for use on an automobile to replace the hand control lever and rods as used at present to control torque convertor and planetary gear transmissions or other automatic transmissions.

Another object of the invention is to provide a push button remote control system for the operation of automobiles which is simpler than any heretofore devised and which requires less effort on the part of the driver than operation, and which at the same time retains all of the safety features and other operating functions of automatic transmission originally contained therein.

Another object of the invention is to provide means for simplifying automobile operation and to provide a mechanism and operating devices therefor which may be operated with more safety and with more positive control than installations heretofore devised.

Another object of the invention is to provide operating means for automobiles to take the place of manual control, whereby by the pressing of buttons in readily accessible positions operating means are automatically actuated in the usual sequential positions, whereby when one button is operated for the desired selective control, other buttons will be automatically disengaged or released from the depressed position.

Another object of the invention is to provide a signalling system in connection with the push buttons so that as each button is depressed or released from the depressed position, a signal lamp is simultaneously operated to visually indicate the actuation or connection which has been made.

Various other objects of the invention will become apparent in connection with the following detailed description of the invention setting forth the construction and operation thereof.

The various features of the invention are illustrated in the accompanying drawings showing the preferred embodiment of the invention in which:

Fig. 6 is a plan view of the push button control assembly showing circuit contacts and portions of the lead wires to the control selector assembly;

Fig. 7 is a view in elevation of the device shown in Fig. 6 and showing one of the push buttons in depressed position, and Fig. 8 is a view in elevation partly in section taken on the section line 8—8 of Fig. 7.

Figure 1:
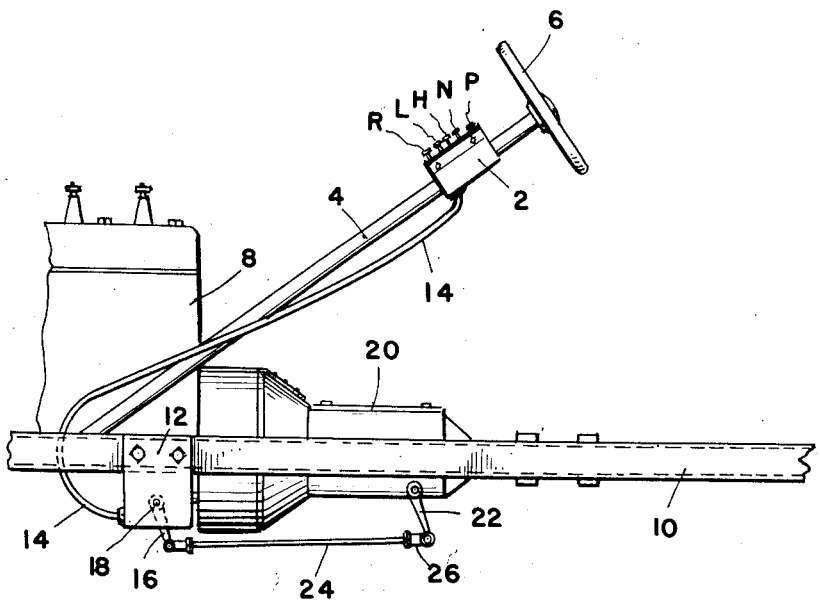
Fig. 1 is a side view illustrating parts of an automobile and showing mechanism embodying features of the invention applied thereto.
Figure 2:
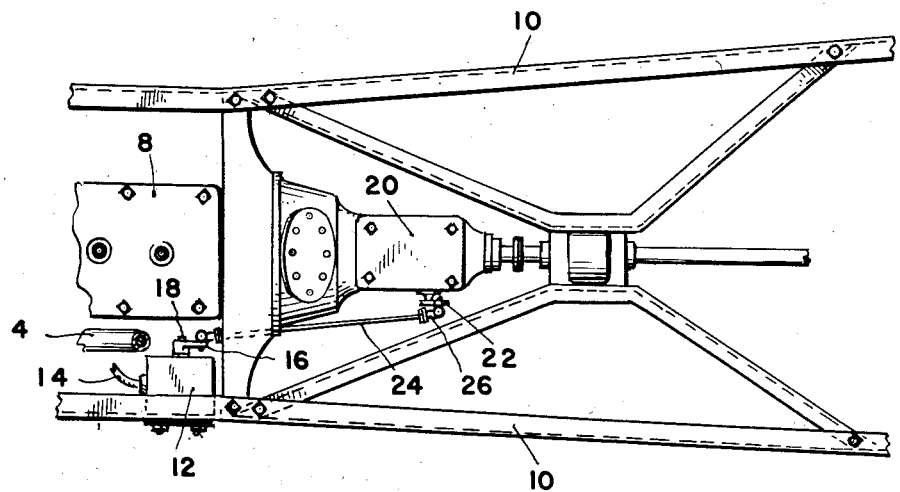
Fig. 2 is a plan view of the parts illustrated in Fig. 1 with the steering wheel and associated parts removed to show underlying parts.

Referring more in detail to the drawing, the numeral 2 (Fig. 1) designates a push button control assembly which is shown mounted on the steering post 4 of an automobile provided with automatic transmission, such as the torque convertor and planetary gear combination type. If desired the push button control assembly 2 may be mounted on the steering wheel 6 so as to be readily visible when operated. The numeral 8 designates a portion of the automobile engine. Mounted on the chassis or frame 10 of the automobile is a control selector assembly 12 which is mounted in a suitable casing and is connected by lead wires or cable 14 to the push button control assembly 2, hereinafter more fully described. The cable 14 consists of a sufficient number of wires to complete the circuits required by the operation of the transmission, as indicated diagrammatically in Fig. 3 of the drawings.

The control selector assembly 12 is provided with a shifting lever arm or selector lever 16, which is directly connected to a selector shaft 18 of the selector assembly which carries various operating parts as hereinafter described.

The numeral 20 designates the casing of the automatic transmission device which carries a lever or transmission selector valve lever 22, which is connected in turn to the shifting lever arm 16 through a connecting rod 24 carrying an adjusting clevis 26, by which necessary adjustment in the length of the connecting rod may be made.

The push button control assembly 2 is preferably provided with a series of push buttons P, N, H, L and R controlling parking, neutral, high range, low range and reverse connections in the preferred assembly, although other operating buttons may be used for other operations in certain installations, and a fewer number of buttons may be used, depending on the specific operation desired.

Figure 3:
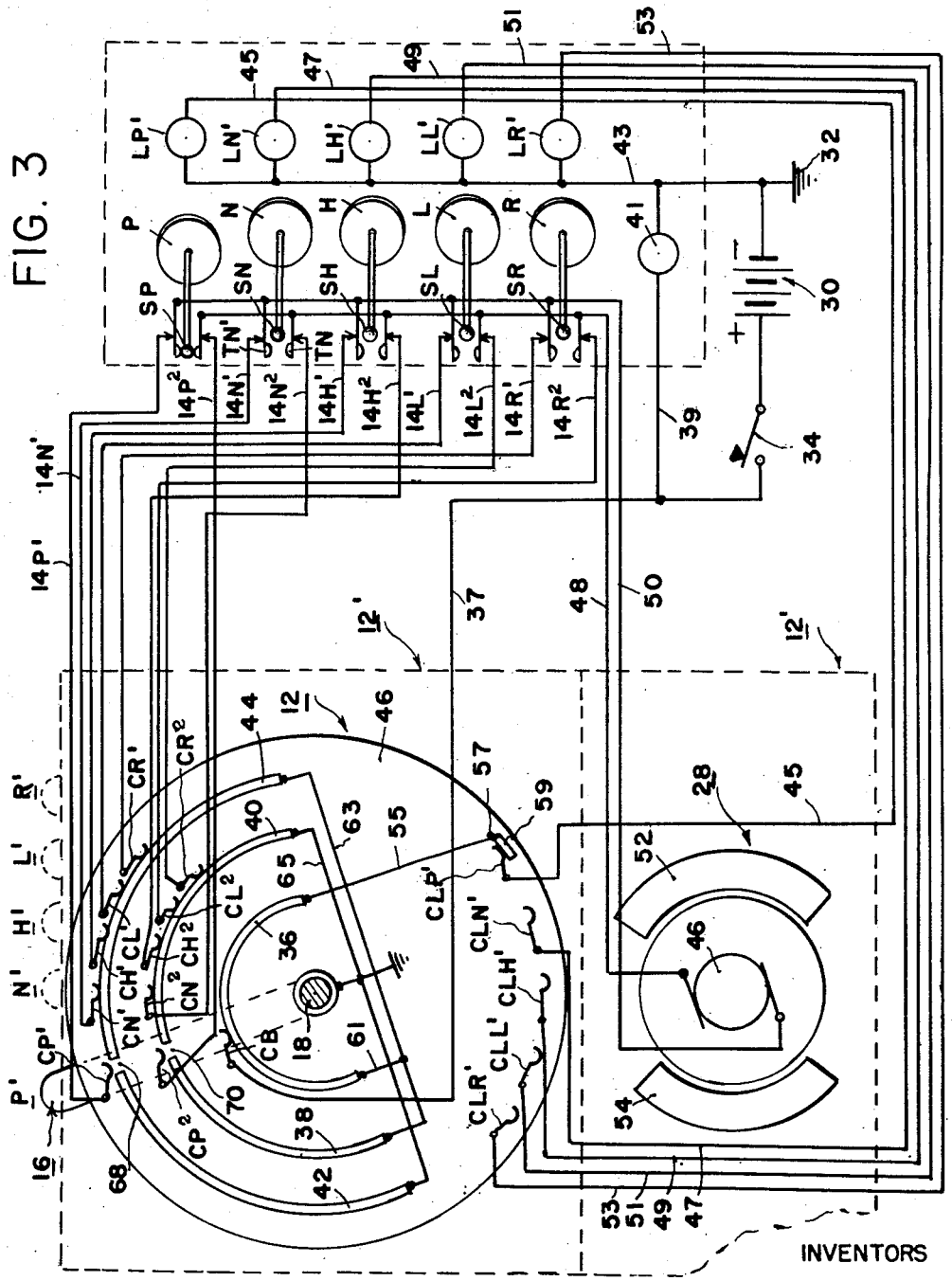
Fig. 3 is a diagrammatic view showing the push button control assembly of the invention, and the control selector assembly and associated parts.

Referring to Fig. 3 of the drawings, the numeral 18 designates the selector shaft of the control selector assembly, on which the shifting lever arm 16 is mounted, the shaft 18 being connected through a train of gears to a motor 28, which is operated by means of various circuits when one of the series of buttons P, N, H, L and R, is pressed, by which the lever 16 is moved into corresponding positions P', N', H', L' and R', as indicated in Fig. 3 of the drawings.

The car battery 30 is grounded at 32 in the usual manner on the chassis of the car and an ignition switch 34 is provided to furnish the necessary operating power to the circuits from the battery. A series of curvilinear metal segments 36, 38, 40, 42 and 44 are mounted on a disc member 46 which is supported by the shaft 18 in the control selector assembly 12. A series of contactors or contact members CP', CN', CH', CL' and CR' are mounted in position to contact with the metal segments 44 and 42, and a series of contactors CP², CN², CH², CR² and CL² are mounted in position so as to contact with metal segments 40 or 38, the various contactors or contact members being connected through lead wires to the corresponding push button assembly so as to complete a circuit through each of the push buttons when it is pressed into position to complete the circuit, as is clear from the wiring diagram of Fig. 3.

The motor 28 in the assembly is preferably a six volt D. C. motor operated from the car battery 30 or from some auxiliary source, such as a six-volt dry battery as may be required for emergency operation. The motor has a permanent field excitation 52 and 54, so that the motor is readily reversible by reversing the direction of current feed to the same.

Current feed to the motor is provided from the leads 48 and 50, which are in circuit with all of the push buttons P, N, H, L and R in the depressed position, so that whichever push button is pressed, the motor will be operated to rotate the shaft 18 through the train of gears 60, 62, 64, 66, 68, 70, 72, 74 and 76, by which the lever 16 is correspondingly operated.

The push button assembly 2 comprises an outer casing 80 having top and bottom guide plates 82 and 84, in which the push button stems RS, LS, HS, NS and PS are slidably mounted, being spring pressed by means of restoring springs 86, 88, 90, 92 and 94, which urge the push buttons associated therewith upwardly as soon as they are released from their locked positions. A sliding bar 96 is provided which is mounted transversely in the casing in association with the push button stems and is adapted to slide in the end portions 98 and 100 of the casing, the sliding bar being urged toward the left in Fig. 7 by means of the spring member 102. The bar member 96 carries a series of cams 104, 106, 108, 110 and 112 which are adapted to project through corresponding openings, as 111 in the stem plate member 120, in the stem plate members 114, 116, 118, 120 and 122. Carried by the stem plate members and disposed at right angles thereto are contact carrying plate members, as 124, connected to the stem plate member 120, so as to move therewith when the corresponding button, as N, is pressed into its depressed position. In the depressed position of the button, as N, the contacts 126 and 128 engage the corresponding terminals 130 and 132, so as to complete the circuits through the leads, as 14N' and 14N², which connect the contactors CN' and CN² respectively, and correspondingly, the contacts 134 and 136 engage the terminals 138 and 140 which are connected to the lead wires 43 and 47, by which current is simultaneously fed through the corresponding lamp LN' to indicate that the circuit of the depressed button N is in operation.

When a push button, as N, for example, is pressed into its lowered or depressed position, the bar member 96 is urged to the left in Fig. 7, by means of the cross piece 142, adjacent the opening 111, which operates on the face of the cam 110, moving the bar member 96 to the left, and as soon as the nose of the cam member 110 is cleared by the cross piece 142, the bar member 96 is immediately urged to the right by means of the spring member 102 and is locked in position in the opening in the stem plate member 120 above the cross piece 142. As the push button N is depressed, the spring member 92 is compressed by means of the shoulder 93 pressing the spring against the guide plate 84, and is thus in readiness to urge the stem member 120, together with the button N, as soon as it is released by the movement of the bar member 96 to the left in Fig. 7, by the pressing of another push button in the series.

Simultaneously with the depressing of the push button N, the contacts carried by the plate member 124 engage the corresponding circuit terminals, as above described, completing the circuits so as to carry out the operations hereinafter described.

Contacting with the metal segment 36 is a contactor CB which is connected to the wire 37 which leads to the switch terminal of switch 34 and also to the branch wire 39 which is connected to a pilot lamp 41, which becomes lighted when the ignition switch 34 is turned on. Connected to the branch wire 39 is a lead wire 43 across which are shunted the pilot lamps LP', LN', LH', LL' and LR' to lead wires 45, 47, 49, 51 and 53, which are respectively connected to contactors CLP', CLN', CLH', CLL' and CLR', which in turn contact the metal segment 59 on the disc member 46 as it is rotated into the corresponding positions to complete the circuits as the disc and lever member 16 are actuated by the motor 28 when each of the push buttons is depressed, simultaneously lighting up the corresponding pilot light to indicate that the corresponding push button has been depressed and that the operation of the selector has been completed.

One end of the metal segment 36 is connected by means of a lead wire 55 to a terminal 57 of the metal contact member 59, on which the contact members or contactors CLP', CLN', CLL' and CLR' ride when the corresponding circuits are completed. The other end of the metal segment 36 is connected to a lead wire 61, which in turn is connected to a cross wire 63, which is connected to one end of the segment 38 and to an end of the segment 44. Another cross wire 65 connects one end of the segment 40 with the segment 42, as shown in Fig. 3 of the drawings.

In operation, when the ignition switch 34 is turned on, the segment 36 is energized through the conductor 37 via the contactor CB. Segments 38 and 44 also become energized via leads 61 and 63. Pilot lamp 41 is lighted by current through wire 39, through the ignition switch and to ground. Segments 40 and 42 are connected to ground through the selector disc shaft 18, which in turn is grounded to the frame of the car to which the apparatus is attached. It will be apparent, therefore, that when the contactors CP', CP²; CN', CN²; CH', CH²; CL', CL²; and CR', CR² bear upon segments 38, 40, 42 and 44, the contactors are energized with the polarity of the current carried by the segments. Furthermore, the polarity imparted to each contactor is reversed when it passes over the insulated spots which separate adjacent segment ends to the adjacent segment as the selector disc rotates. Each of the five sets of contactors become de-energized as they bear upon or contact with the insulated spots between the segments. It will be noted that the insulated spots 68, between the ends of the segments 42 and 44, and insulated spot 70, between the segments 38 and 40, are in line with the selector shaft 16, as is indicated in Fig. 3 of the drawings, and as both the disc 46 and the lever or selector shaft 16 are both fixedly mounted on the shaft 18, this alignment persists throughout the operation of the apparatus.

Assuming, for example, that the selector is in parking position, in which the selector button P is in the depressed position. The contactors CP' and CP² are then resting on the insulated sections 68 and 70 respectively and are therefore de-energized. The ignition switch 34 is in the "on" position, the pilot lamp 41 is lighted and current from the battery 30 is fed from segment 36 via the lead 55, segment 59, contactor CLP' and conductor or lead wire 45 to the indicator lamp LP'. It will be understood, of course, that the segment 36 receives current from the battery 30 through the switch 34 to the lead wire 37 to the contactor CB which is in continuous contact with the segment 36.

Figure 4:
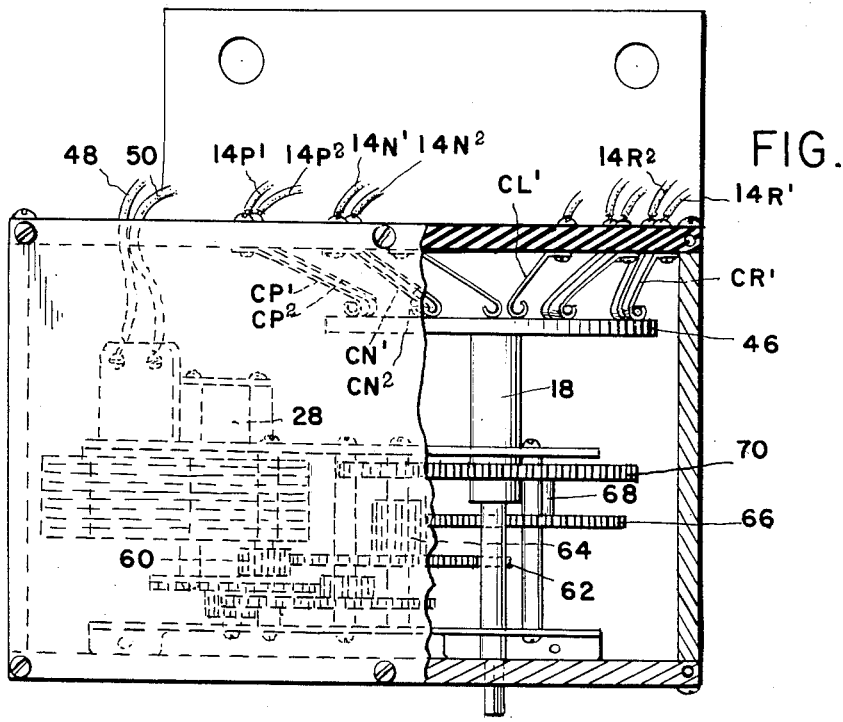
Fig. 4 is a plan view showing the control selector assembly, a part of the container therefor being broken away to show underlying operating parts.
Figure 5:
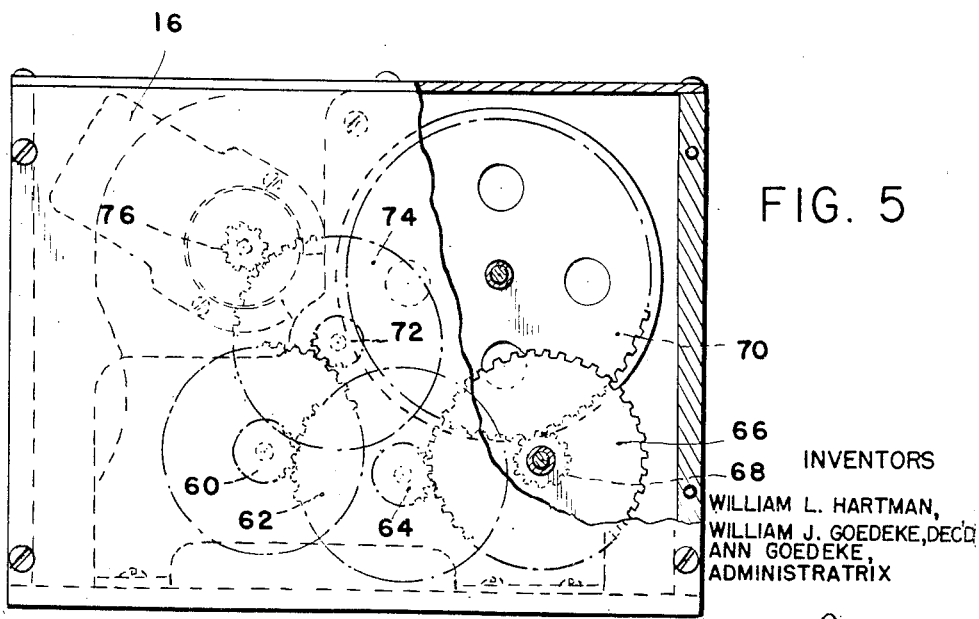
Fig. 5 is a view in elevation of the device shown in Fig. 4, in which a portion of the casing is broken away to show a part of the gear mechanism.

When the selector button H is depressed, the button P is automatically restored to its normal "off" position in the same manner as above described in connection with the restoring of the button N. When the button H is depressed, the circuit is closed by the button switch SH which feeds current from the contactors CH' and CH² through the lead wires 14H' and 14H² and through the lead wires 48 and 50 to the motor armature 46 of the motor 28, above described, causing the mechanism or gear train of Figs. 4 and 5 to rotate the selector disc 46 in a clockwise direction until the contactors CH' and CH² come to rest on the insulated spaces 68 and 70, respectively. In this position, the contactors CH' and CH² become de-energized immediately, opening the motor circuit and stopping the mechanism so that the selector lever 16 will have actuated the transmission selector valve to the high range or driving position.

With the selector disc 46 in the "H" or high range position, it will be noted that the contactors CP', CP², CN' and CN² are to the left of the insulated spaces 68 and 70 of the contactor segments and that the contactors CL', CL², CR' and CR² are to the right of the insulated spaces. The selector buttons connected to any of the contactors to the left of the insulated spaces will cause the mechanism to rotate in a counter-clockwise direction when depressed, while contactors resting on the segments to the right of the insulated spaces will cause the mechanism to rotate in a clockwise direction. As the disc 46 rotates, the segment 59 will contact corresponding contactors of the series CLP', CLN', CLH', CLL' and CIR' of the closed circuit causing the associated pilot lamp to indicate the position in which the selector lever 16 has stopped, or the particular circuit which is in operation.

It will be understood that various changes or modifications may be made in the device as described, as will be apparent to those skilled in the art, without departing from the spirit or scope of the invention as defined in the claims annexed hereto.

Having thus described the invention, what is claimed as new is:

1. A push button remote control device for the operation of automobiles having automatic transmission which comprises a control button assembly including neutral, high range, low range and reverse connections corresponding to positions for automatic transmission, a separate switch connected to each of the push buttons of said assembly, a direct current reversing motor of low voltage, a control selector assembly having a selector disc member mounted on a selector shaft, a series of concentric metal arced segments mounted on said disc, two pairs of said arced segments having sections separated by insulated portions, a shifting lever arm connected to said selector shaft, a series of pairs of contactors mounted in fixed positions adjacent said disc member to simultaneously ride on juxtaposed sections of said arced segments and to simultaneously contact said insulated portions as the selector disc is rotated on said shaft, wires connecting each of said pairs of contactors with corresponding opposed terminals of each of said separate switches and means connecting said motor in circuit to operate said shifting lever and said disc while a pair of contactors are in contact with juxtaposed sections of opposed arced segments and to disconnect said motor to discontinue rotary movement of the disc member when the pair of contactors are in contact with said insulated portions.

2. A push button remote control device for the operation of automobiles having automatic transmission which comprises a push button control assembly having a plurality of push buttons, a separate switch member operatively connected to each of said push buttons, a control selector assembly having a selector disc member mounted on a selector shaft to rotate therewith, a series of concentric metal arced segments mounted on said disc, two pairs of said arced segments having separated sections with insulated portions between adjacent sections, a shifting lever arm connected to said shaft, a series of pairs of contactors mounted in fixed positions adjacent said disc member to simultaneously ride on juxtaposed sections of opposed arced segments and to simultaneously contact with said insulated portions between adjacent sections as the selector disc is rotated on said shaft, a direct current reversing motor of low voltage, a car battery in circuit with said motor through an ignition switch, conducting wires connecting each of said pairs of contactors with corresponding opposed terminals of each of said separate switches, reduction gearing connecting said motor with said selector shaft, and conducting wires connecting said motor in circuit to operate said shifting lever and said disc while a pair of contactors are in contact with juxtaposed sections of opposed arced segments and to discontinue the operation of said motor as the pair of contactors ride into contact with insulated portions between opposed arced segments.

3. A push button remote control device for the operation of automobiles having automatic transmission which comprises a series of push buttons corresponding to parking, neutral, high range, low range and reverse connections corresponding to positions for automatic transmission, a separate switch member operatively connected to each of said push buttons, means for locking each of said push buttons in the depressed position and for simultaneously releasing any previously depressed button as each push button is depressed, a control selector assembly having a selector disc member mounted on a selector shaft to rotate therewith, a pair of concentric metal arced segments mounted on said disc concentric to said shaft, said pair of segments having separated sections carrying insulated portions therebetween, a shifting lever arm connected to said selector shaft, said insulated portions being in alignment with said lever arm, a series of pairs of contactors mounted in fixed positions adjacent said disc member and independent of the movements of said disc member to simultaneously ride on juxtaposed sections of said arced segments and to simultaneosly contact with said insulated portions as the selector disc is rotated, a metal arced segment mounted on said disc concentric with said shaft, a contactor mounted to ride on said last-named arced segment, a wire conductor connecting said last-named contactor in circuit with said switch member when in closed position, a direct current reversing motor of low voltage, a car battery in circuit with said motor through said ignition switch and reduction gearing connecting said motor with said selector shaft.

4. A push button control device for the operation of automobiles having automatic transmission which comprises a control button assembly including push button connections corresponding to positions for automatic transmission, a separate switch member connected to each of the push buttons of said assembly, a car battery, a direct current reversing motor of low voltage adapted to be operated by said battery, a control selector assembly mounted on a selector shaft, said control selector assembly having a selector disc member mounted on said shaft, a series of concentric metal arced segments mounted on said disc member, two pairs of said arced segments having insulating sections separating portions of each of the arcs, a shifting lever arm connected to said selector shaft, a series of pairs of contractors mounted in fixed positions adjacent to and independent of said disc member to simultaneously ride on juxtaposed sections of said arced segments with reference to each pair of contactors, each of said pairs of contactors being mounted so as to simultaneously contact corresponding insulating sections as the selector disc is rotated on said shaft, conducting wires connecting each of said pairs of contactors with corresponding opposed terminals of each of said separate switches and means connecting said motor in circuit with said battery to operate said shifting lever and said disc while a pair of contactors is in contact with juxtaposed sections of opposed arced segments and to disconnect said motor to discontinue rotary movement of the disc member when the said pair of contactors is in contact with said insulating sections.

5. A push button remote control device for the operation of automobiles having automatic transmission which comprises a push button control assembly having a plurality of push buttons, a separate switch member operatively connected to each of said push buttons, a control selector assembly having a selector disc member mounted on a selector shaft to rotate with said selector shaft, a series of concentric metal arced segments mounted on said disc, two pairs of said series of arced segments having separated sections with insulated areas between adjacent sections, a shifting lever arm connected to said shaft, a series of pairs of contactors mounted in fixed elevated positions adjacent said disc member to simultaneously ride on juxtaposed sections of opposed arced segments and adapted to simultaneously contact with said insulated areas between adjacent sections of the arced segments as the selector disc is rotated on said shaft, a direct current reversing motor of low voltage, a car battery in circuit with said motor through an ignition switch, conducting wires connecting each of said pairs of contactors with corresponding opposed terminals of each of said separate switches, reduction gearing operatively connecting said motor with a peripheral gear on said selector shaft, conducting wires connecting said motor in circuit to operate said shifting lever and therethrough said disc while a pair of contactors are in contact with juxtaposed sections of opposed arced segments and to discontinue the operation of said motor as the pair of contactors ride into contact with insulated positions between opposed arced segments and an indicator lamp in circuit with each of said push buttons so as to light up when a push button is moved into depressed position and to be extinguished when the push button is restored.

6. A push button remote control device for the operation of automobiles having automatic transmission which comprises a series of push buttons corresponding to parking, neutral, high range, low range and reverse connections corresponding to positions for automatic transmission, a separate switch member operatively connected to each of said push buttons, means for locking each of said push buttons in the depressed position and for simultaneous-releasing any previously depressed push button as each push button is depressed, a control selector assembly having a selector disc member mounted on a selector shaft to rotate therewith, a pair of concentric metal arced segments mounted on said disc concentric with said shaft, a pair of segments having separated sections carrying insulated areas between the sections, a shifting lever arm connected to said selector shaft, said insulated areas being in alignment with said lever arm, a series of pairs of contactors mounted in fixed positions adjacent said disc member in positions so as to be independent of the movements of said disc member and to simultaneously ride on juxtaposed sections of the pairs of said arced segments and to simultaneously ride on and contact with said insulated areas as the selector disc is rotated, a metal arced segment mounted on said disc concentric with said shaft, a contactor mounted to ride on said last-named arced segment, a wire conductor connecting said last-named contactor in circuit with said switch member when in closed position, a direct current reversing motor of low voltage, a car battery in circuit with said motor through said ignition switch, reduction gearing operatively connecting said motor with a gear on said selector shaft, conducting wires connecting said motor in circuit to operate said shifting lever and said disc while a pair of contactors are in contact with juxtaposed sections of opposed arced segments and to discontinue the operation of said motor as the pair of contactors ride into contact with insulated areas between sections of the opposed arced segments, an indicator lamp in circuit with each of said separate switch members so as to light up as each push button is moved into depressed position closing the corresponding separate switch and to be extinguished when a different push button is depressed and the first operated push button is restored, and a pilot lamp in circuit with the ignition switch to indicate when the ignition switch is in the "on" position.

7. A push button remote control device in accordance with claim 1 in which the direct current reversing motor and the control selector assembly are mounted in a casing in which the pairs of contactors are mounted on the inside wall of one of the faces of the casing opposite the face of the disc member carrying the metal arced segments, and in which the contactors are mounted in fixed positions on said face so as to engage the face of the disc member in the paths of the metal arced segments as the disc member is rotated on said selector shaft.

8. A push button remote control device in accordance with claim 2 in which the direct current reversing motor and the control selector assembly together with the selector disc member are mounted in a casing having two metal side walls and the front face and top thereof of metal, and the bottom and rear wall, together with said disc member, are of insulating material and in which the pairs of contactors are mounted on the inside face of the rear wall opposite the face of the disc member which carries the metal arced segments and in which the pairs of contactors are mounted in fixed positions on the inside face of the rear wall so as to contact the metal arced segments along the paths of the pairs thereof as the said disc member is rotated on the selector shaft.

9. A push button remote control device for the operation of automobiles having automatic transmission provided with a selector lever, comprising, a series of push buttons, a control selector assembly having a selector disc member mounted on a selector shaft to rotate therewith, said shaft operatively connected to said selector lever, a separate switch member operatively connected to each of said push buttons together with wiring connecting each of the separate switches with pairs of contactors mounted in fixed position adjacent said disc member so as to ride in contact with pairs of arced segments of different polarity on the disc member, a car battery, a direct current reversing motor in circuit with said battery, and reduction gearing connecting said motor with said selector shaft for driving said disc member.

10. A push button remote control device in accordance with claim 9 in which the direct current reversing motor is a permanent magnet motor.

11. A push button remote control device in accordance with claim 5 in which the direct current reversing motor is a six volt motor.

ANN GOEDEKE,
*Administratrix of the Estate of William James Goedeke, Deceased.*
WILLIAM LESTER HARTMAN.

REFERENCES CITED

The following references are of record in the file of this patent:

UNITED STATES PATENTS

| Number | Name | Date |
|---|---|---|
| 983,949 | Sundh | Feb. 14, 1911 |
| 2,244,092 | Wheeler | June 3, 1941 |
| 2,270,581 | Clarke | Jan. 20, 1942 |
| 2,304,862 | Thomas | Dec. 15, 1942 |
| 2,323,619 | Panish | July 6, 1943 |
| 2,407,310 | Lundy et al. | Sept. 10, 1946 |
| 2,462,779 | Russell | Feb. 22, 1949 |
| 2,464,845 | Bodmer | Mar. 22, 1949 |